United States Patent [19]

Kitaguchi

[11] 4,062,552

[45] Dec. 13, 1977

[54] TOOL-HOLDER CHUCK

[75] Inventor: Ryoichi Kitaguchi, Higashiosaka, Japan

[73] Assignee: Daishowa Seiki Co., Ltd., Higashiosaka, Japan

[21] Appl. No.: 759,176

[22] Filed: Jan. 13, 1977

[51] Int. Cl.² ............................................... B23B 5/22
[52] U.S. Cl. ................................ 279/1 TS; 279/1 B; 279/103
[58] Field of Search ............ 279/1 R, 1 A, 1 B, 1 TS, 279/9 R, 102, 103

[56] References Cited

U.S. PATENT DOCUMENTS

| 3,405,950 | 10/1968 | Cox | 279/103 |
|---|---|---|---|
| 3,663,028 | 5/1972 | King et al. | 279/1 B X |
| 3,679,220 | 7/1972 | Reeves | 279/1 B |
| 3,829,109 | 8/1974 | Koch | 279/1 B X |

Primary Examiner—Harrison L. Hinson

[57] ABSTRACT

A tool-holder chuck for receiving therein a tool holder provided with various tools such as end mills or drills, etc., e.g. in a milling machine, which chuck can be changed easily when necessary, comprising a clamp including a nut which is threaded to a chuck body, a clamp ring which can move only in the coaxial direction against the body, and a plurality of rolling members that transmit at least the coaxial movement of the nut to the clamp ring when it is screwed in, projections on the tool holder being pressed inward by the coaxial movement of the clamp ring as a result of screwing of the nut, and a taper spindle of the holder, that interlocks with a tapered bore of the chuck body. In this way direct sliding friction against the projections is eliminated, and the tool holder can be clamped tightly, with relatively small screwing force of the nut, utilizing the sliding friction between the nut and the clamp ring.

6 Claims, 5 Drawing Figures

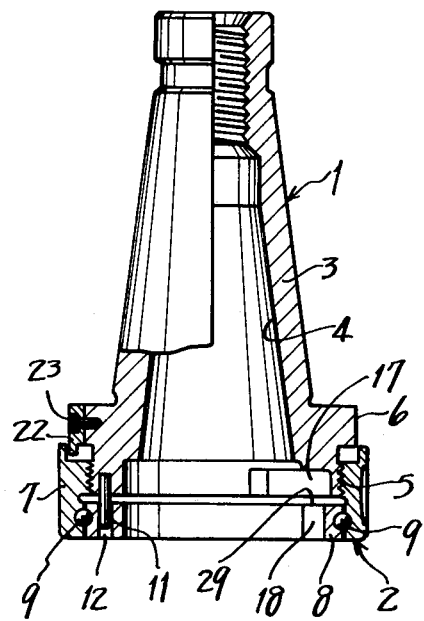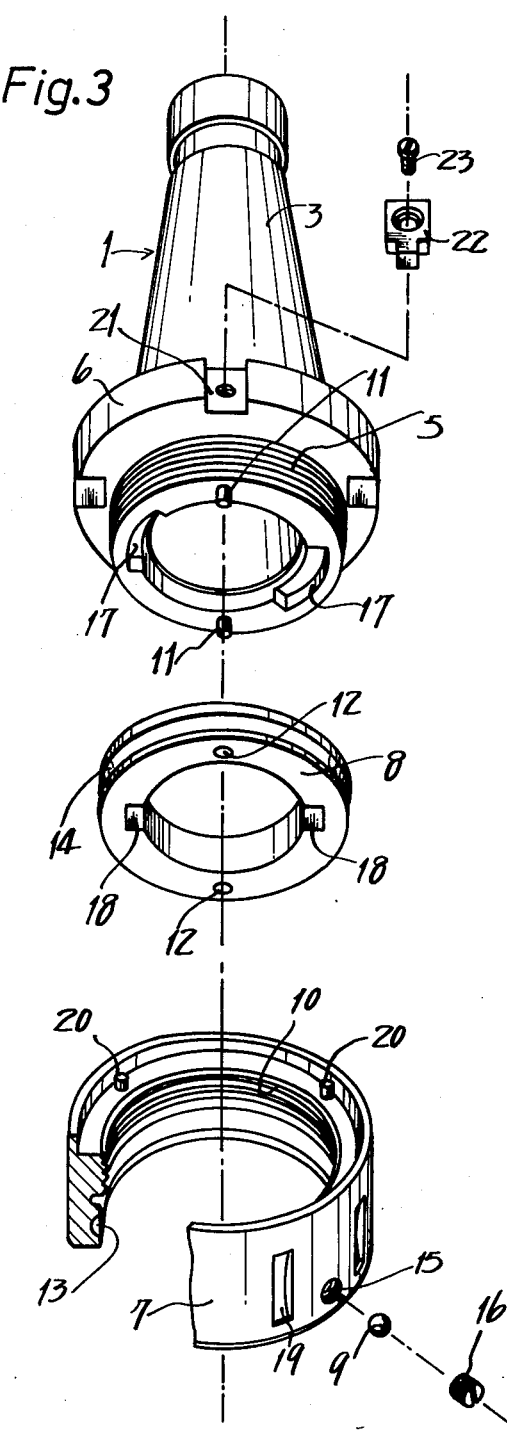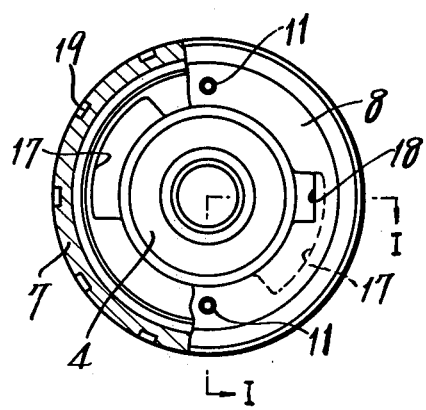

TOOL-HOLDER CHUCK

The present invention relates to an improvement in tool-holder chucks, especially those chucks in which tool holders can be changed quickly by simple operations.

A tool holder with a taper spindle, provided with various kinds of tools, such as end mills or drills for milling machines, is mounted to the tool-drive spindle of the machine tool through a chuck having clamp means and a chuck body that is provided with a tapered bore in which the taper spindle is inserted.

In chucks of the conventional type as mentioned above, the clamp means is threaded on the chuck body fixed to the tool-drive spindle; in ring-shaped clamp means, a part threaded on the chuck body, a surface to push projections to install the tool holder inward in the coaxial direction, and another part having coaxial notches to lead the projections to the coaxial pressing surface, have been formed integrally. In order that the projections might be placed on the coaxial pressing surface through the notches, the taper spindle of the holder is inserted in the tapered bore of the chuck body, then the projections are pressed inward in the coaxial direction of the pressing surface of the clamp means, by screwing the clamp means in the chuck body, and the taper spindle of the tool holder is pressed in the tapered bore and tightly fixed.

In such a case, the pressing surface, contacting closely the projections of the tool holder and pressing to remove them inward in the coaxial direction, rotates simultaneously with the projections. Accordingly when the taper spindle begins to touch the tapered bore, heavy sliding frictional resistance is generated between the contact surfaces of the pressing surface and the projections. Therefore it was necessary to screw in the clamp means with spanners, etc., against this extremely heavy sliding frictional resistance, and considerable operational force was needed. In other words, it has been very difficult to obtain a great clamping force of the tool holders.

Furthermore, in chucks of the conventional type, when the tool holder is demounted by loosening the screw of the clamp means, the tool holder might slip down if the projections engage the coaxial notches of the clamp means by the relative sliding movement in the circumferential direction between the projections of the tool holder and the pressing surface of the clamp means. Consequently, and particularly when a very heavy tool holder is used, there is a danger of the tool holder slipping out unexpectedly against the bite resistance between the taper spindle and the tapered bore, when the clamp means is loosened, so that in such a case an additional person was needed to take hold of the tool holder.

The principal object of the present invention is to provide an improved tool-holder chuck which resolves all such problems of conventional chucks as mentioned above.

The tool-holder chuck according to the present invention is characterized in that the clamp means, which hitherto has been constructed as a single part and was formed integrally, now includes a nut which is threaded on a threaded portion of the chuck body, a clamp ring which can move only in the coaxial direction with the body, and a plurality of rolling members such as balls which transmit at least the coaxial movement of the nut when screwing in the clamp ring. Also, the clamp ring may have coaxial notches to lead the projections of the tool holder, and a coaxial pressing surface for the projections.

According to the present invention, the clamp ring, which has the pressing surface to contact the projections of the tool holder, moes only in the coaxial direction without rotating. Therefore no relative sliding frictional movement occurs between the projections and the pressing surface that contacts the projections irrespective of whether the nut is screwed in or loosened.

Yet, the coaxial movement of the nut during its tightening is transmitted to the clamp ring by the rolling friction that results from the revolution of the plurality of rolling members or balls. Accordingly, the tool holder can be clamped and fixed tightly in the coaxial direction with a relatively slight screwing force. In other words, a great clamping force can easily be obtained for the tool holder.

Moreover, according to the present invention, the unexpected and undesirable slippage of the tool holder is prevented completely even when the nut is released in order to demount the tool holder, because the projections of the latter stay on the coaxial pressing surface of the clamp ring, considering that the projections are not made to engage the coaxial notches of the clamp ring by the positive rotating operation of the tool holder. Therefore, only one person is needed to demount even a heavy tool holder, who can do it safely and easily.

The taper spindle of the tool-holder chuck of the conventional type bites into the tapered bore of the chuck body so that, when a light tool holder is used, it is very difficult to demount the latter, pulling it out, even when the clamp means is lossened. Accordingly, not only much effort and time have been needed because the tool holder was pulled out by striking it after the clamp means is released, but also this fact has constituted one of the causes of serious degradation of the accuracy because shocks are imparted to the tool-drive spindle of the tool holder, chuck or tool of the machine tool.

A preferred, exemplary embodiment of the present invention provides a useful construction by which such problems are resolved. According to the invention, the clamp nut is connected with the clamp ring by a plurality of rolling members in such a manner that both coaxial movements, of screwing-in and releasing the nut, are transmitted to the ring.

The tool holder mounted to this chuck is preferably provided with a coaxial inclined surface which closely contacts the outer surface of the clamp ring. According to the inventive construction, the coaxial regressive movement of the nut is transmitted to the ring when the former is released in order to demount the tool holder, the regressive movement of the clamp ring being transmitted from the outer surface to the tool holder through the coaxial inclined surface of the latter.

Accordingly, the tool holder is made to move automatically in the direction toward which its taper spindle separates from the tapered bore of the chuck body, the engagement between the spindle and the bore being safely released. Thus the tool holder can be pulled out only by rotating it slightly, without the necessity of hitting the holder to pull it out, as this was done before. Other aspects, features, objects and advantages of the invention will become better understood by reference to the following detailed description, when taken with the accompanying drawings, wherein FIG. 1 is a longitudinal, partly sectional side elevation of a chuck body taken along the line I—I of FIG. 2;

FIG. 2 is a partly cut-away bottom view of the chuck body;

FIG. 3 is a partly cut-away exploded perspective view of the same;

Figure 4:
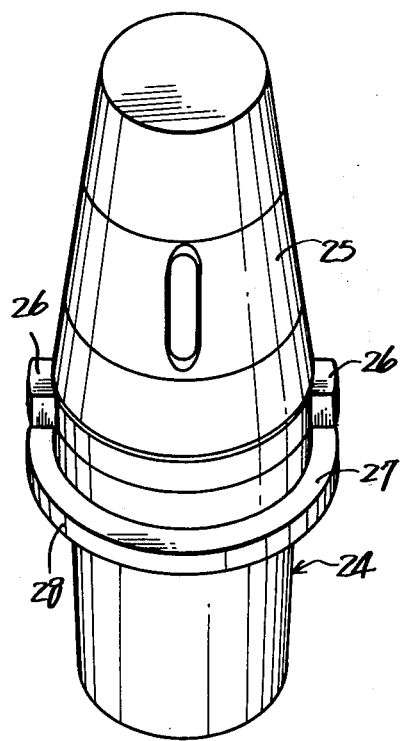
Figure 5:
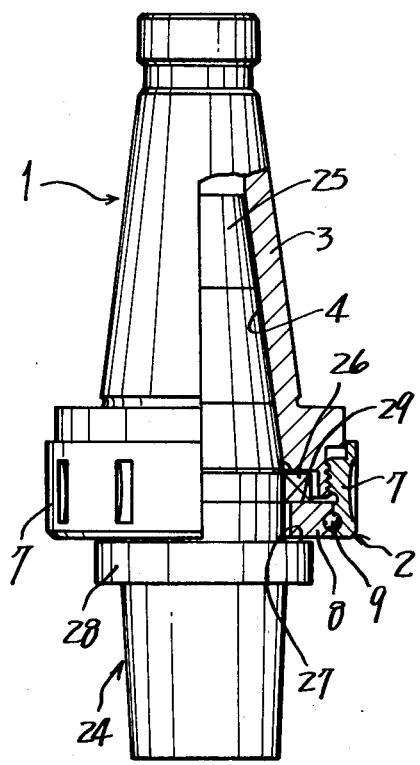

FIG. 4 is a perspective view of a preferred form of an assembled tool holder of the present invention; and FIG. 5 is a partly cut-away side elevation showing the tool holder of FIG. 4 in a mounted state. In FIGS. 1 and 3, numeral 1 designates a tool-holder chuck body, while numeral 2 designates clamp means. The chuck body 1 is provided with a taper spindle 3 to be mounted to a main or tool-drive spindle of a machine tool (not shown). A tapered bore 4 is provided concentrically in the spindle 3. Numeral 5 is a threaded portion provided around the outer periphery of the larger end of the body 1, while numeral 6 designates a flange provided in the body 1 so as to be contiguous to the threaded portion 5.

The clamp means 2 includes a nut 7, a clamp ring 8 and a plurality of steel balls 9. It will be understood from the description that follows that the ring 8 has an outer peripheral end surface for cooperation with other elements of the structure, to be described in more detail. The nut 7 engages the threaded portion 5 of the body 1 at a threaded portion 10 (FIG. 3) provided inside the nut 7, the ring 8 being placed inside the nut 7, and at the same time in a coaxial perforated hole 12 it engages two pins 11 which project from the end of the body 1 in a coaxial direction so as to slide only in that direction.

The balls 9 are inserted loosely between a ring-shaped groove 13 provided on the interior periphery of the nut 7, and another ring-shaped groove 14 is provided on the outer periphery of the clamp ring 8 so as to be arranged in series in the circumferential direction. A required number of these steel balls 9 is inserted in ring-shaped passages formed by both grooves 13, 14 through perforated holes 15 which are provided in the nut 7 and drilled to the ring-shaped groove 13 of the nut 7, and then the perforated holes 15 are closed by screw plugs 16 (the elements 13 through 16 can be seen in FIG. 3).

Numeral 17 designates circular concavities to receive projections which are provided from the interior periphery to the large end surface of the body 1, and the concavities are provided on both sides, symmetrically in the diametral direction, making the center of the spindle their own center. Numeral 18 relates to coaxial notches in order to lead the projections provided inside the ring 8, and they are provided so as to connect with the end that is positioned at a place of symmetry in respect of the concavities 17.

Further concavities 19, to install spanners, may be provided at proper intervals on the outer periphery of the nut 7, to pins 20 (FIG. 3) projecting from the end surface of the threaded portion 10, to limit the range of rotation. On the other hand, stoppers 22 are mounted with screws 23 to the flange 6 at coaxial notched portions 21 provided at suitable positions of the flange, the tops of the stoppers 22 being placed within the rotational tracks of the pins 20 to limit the range of rotation of the nut 7.

FIG. 4 shows a tool holder 24 which is mounted to the chuck of such constructions as was explained above. The tool holder is provided with a taper flange 25 which can be fitted closely to the tapered bore 4 of the chuck body 1, and projections 26, that project respectively on either side in the diametral direction, are provided on the outer periphery of the large end of the flange 25. Numeral 27 is a coaxial inclined surface between the projections 26 at intervals of a little more than the thickness of the ring 8, and is formed by a flange 28. A coaxial pressing surface 29 will be described later with reference to FIGS. 1 and 5.

Now the method of mounting and demounting the tool holder 24 will be explained. First of all, the nut 7 is released (ordinarily in the anti-clockwise direction) until there is interference by the butt of the pins 20 and the stoppers 22, and the nut is then moved to a coaxial regressive limit position from the body 1. As a result, the clamp ring 8, which is connected to the body by the nut 7, and the steel balls 9 are also positioned at the limit position after being separated from the body 1. Under such conditions, the flange 25 of the tool holder 24 is inserted in the bore 4 of the body 1 so that the projections 26 may enter the concavities 17 of the body through the notches 18 of the ring 8. Then the tool holder 24 is rotated in the clockwise direction, the projections 26 are moved to the innermost part of the concavities 17, and the projections 26 are positioned on the end surface opposite the concavities 17, of the clamp ring 8, that is, on the coaxial pressing surface 29, to press the projections 26 in a coaxial direction (see FIG. 5).

In this way, the nut 7 is rotated in the clockwise direction by suitable tools such as spanners under the state of provisional fixing of the tool holder 24 to the inventive chuck, screwed into the body 1 and moved forward in the coaxial direction. The clamp ring 8 can move only in the coaxial direction by engagement with the pins 11, and the balls 9 which can carry out the rolling movement in the circumferential direction are provided between the nut 7 and the ring 8 so that the rolling movement of the nut 7 is not transmitted to the ring 8, and only the progressive coaxial movement is transmitted to the latter through the balls 9.

By the progressive coaxial movement of the clamp ring 8, the tool holder 24 is pressed inward in the coaxial direction without being accompanied with relative sliding frictional movement between the projections 26 of the tool holder and the pressing surface 29 of the ring, the spindle 25 being tightly fixed to the bore 4 by the pressure thereof.

As will be apparent from the foregoing explanations, a great clamping force can easily be obtained in comparison with any clamping means of the conventional type in which the nut and the clamp ring were formed integrally, the invention allowing the tool holder to be fixed securely because there is no sliding friction between the nut 7 and the projections 26. It is only rolling friction that occurs between the clamp ring 8 and the steel balls 9, and between the nut 7 and the balls 9 in the screwing operation of the nut, in order to mount the tool holder to the body.

Besides, the oscillation of the tool which occurs in heavy cutting is absorbed by the steel balls 9 and is not transmitted directly to the nut 7 so that such a traditional defect as an unexpected loosening of the nut 7 cannot occur.

In order to demount the tool holder 24 when mounted as shown in FIG. 5, the nut 7 is released by rotating it in the anti-clockwise direction. The coaxial regressive movement caused by releasing the nut 7 being transmitted to the clamp ring 8 through the balls 9, the ring 8 carries out the separating movement from the body 1 in the coaxial direction, so that the pressing of the projections by the earlier-mentioned coaxial pressing surface 29 is released.

In such cases the projections 26 will not engage the coaxial notches 18 of the clamp ring 8 because the tool holder 24 is not rotated in the anti-clockwise direction, so that there is no danger of the tool holder 24 slipping out of the body chuck when the nut 7 is released.

When the nut 7 is released to the limit, the ring 8 presses the coaxial inclined surface 27 of the holder 24 away from the body 1 in the course of releasing so that the taper flange or spindle 25 is distanced positively from the tapered bore 4 of the body 1. There is no necessity of beating the tool holder 24 to pull it out, owing to the engagement of the taper spindle and the tapered bore. Accordingly, the tool holder can be pulled out from the chuck in such a manner that the projections 26 are pulled out of the notches 18 by releasing the nut 7 to the limit and rotating the tool holder by hand in the anti-clockwise direction.

Moreover, as mentioned before, the provision of the ring-shaped grooves 13, 14 in the opposite circumferential surfaces of the nut 7 and the ring 8, respectively, and the balls 9 inserted between these grooves are preferred because the coaxial position of the ring with respect to the nut is completely controlled notwithstanding the very simple construction. The coaxial movement of the nut in either direction can be transmitted to the clamp ring 8 through the steel balls 9 that are arranged in a row.

It will be understood by those skilled in the art that several modifications, changes and/or additions can be made in the described exemplary embodiment, without departing from the spirit or scope of the present invention.

What I claim is:

1. A tool-holder chuck comprising a body (1) provided with a tapered bore (4) for receiving therein a taper spindle (25) of a tool holder (24) and a ring-shaped clamp (2) threaded coaxially to said body at the entrance of said bore, said clamp having a coaxial pressing surface (29) to push projections (26) of said tool holder inward, in the coaxial direction, said clamp including a nut (7) attached to a threaded portion (5) of said body, a clamp ring (8) movable only in the coxaial direction against said body, said ring having therein coaxial notches (18) to lead said projections to said coaxial pressing surface, and a plurality of rolling members (9) which transmit at least the coaxial movement of said nut to said ring when said nut is screwed, and can rotate in the circumferential direction, said ring with said notches leading said projections and said coaxial pressing surface.

2. The tool-holder chuck as defined in claim 1, wherein the outer periphery of the larger end of said body (1) has an axis coinciding with that of said notches (18), contacting said end, and at the same time the latter has therein circular concavities (17) that have a longer circumferential width than that of said notches, to receive said projections (26).

3. The tool-holder chuck as defined in claim 1, further compising means movable only in the coaxial direction against said body (1), including at least two pins (11) projecting from the outer periphery of the larger end of said body, and a hole (12) which passes coaxially through said ring (8) and loosely engages said pins.

4. The tool-holder chuck as defined in claim 1, wherein the coaxial reciprocating motion caused by screwing and releasing said nut (7) is transmitted to said ring (8) through said rolling members (9).

5. The tool-holder chuck as defined in claim 4, wherein said rolling members (9) are constituted by balls interposed in the circumferential direction and loosely inserted between a ring-shaped groove (13) provided in an internal peripheral surface of said nut (7) and another ring-shaped groove (14) provided in an outer peripheral surface of said ring (8).

6. The tool-holder chuck as defined in claim 4, wherein said ring (8) has an outer peripheral end surface which contacts a coaxial inclined surface (27) projecting from the outer periphery of the larger end of said tool holder (24).

* * * * *